(12) United States Patent
Sait

(10) Patent No.: US 10,353,745 B1
(45) Date of Patent: Jul. 16, 2019

(54) ASSESSING PERFORMANCE OF DISPARATE COMPUTING ENVIRONMENTS

(71) Applicant: Amazon Technologies, Inc., Seattle, WA (US)

(72) Inventor: Abdul Sathar Sait, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/671,679

(22) Filed: Mar. 27, 2015

(51) Int. Cl.
*G06F 9/455* (2018.01)
*G06F 9/50* (2006.01)

(52) U.S. Cl.
CPC ............ *G06F 9/5077* (2013.01); *G06F 9/455* (2013.01)

(58) Field of Classification Search
None
See application file for complete search history.

(56) References Cited

U.S. PATENT DOCUMENTS

| 7,970,861 B2 | 6/2011 | Simitci | |
| 8,175,863 B1 * | 5/2012 | Ostermeyer | ........ G06F 17/5009 703/13 |
| 2011/0119328 A1 | 5/2011 | Simitci | |
| 2012/0144008 A1 * | 6/2012 | Yuyitung | .............. G06F 9/5066 709/223 |
| 2013/0042123 A1 * | 2/2013 | Smith | ................... G06F 9/5094 713/300 |
| 2013/0219390 A1 * | 8/2013 | Lee | ......................... G06F 9/455 718/1 |
| 2014/0032761 A1 * | 1/2014 | Beveridge | ............. G06F 9/5011 709/226 |
| 2015/0032894 A1 * | 1/2015 | Rosensweig | ........ H04L 41/5019 709/226 |
| 2016/0162338 A1 * | 6/2016 | Sathyamurthy | ....... G06F 9/5077 718/1 |

* cited by examiner

*Primary Examiner* — Dong U Kim
(74) *Attorney, Agent, or Firm* — Knobbe, Martens, Olson & Bear, LLP

(57) ABSTRACT

Systems and methods are described for accurately determining the performance of a networked computing environment relative to the predicted performance of a target computing environment. The computing environment performance for a particular workload are related to each other by determining a coefficient of equivalency. The coefficient of equivalency may be determined based on the time, cost, or other criteria associated with executing the workload, and may be determined by assessing the relative performance of various computing resources (such as central processing units and computer-readable media) in the respective environments and assessing the demand placed upon these resources by the particular workload. The coefficient of equivalency may further be determined based in part on capacity limitations and substitutions of one computing resource for another in the respective computing environments.

21 Claims, 8 Drawing Sheets

ASSESSING PERFORMANCE OF DISPARATE COMPUTING ENVIRONMENTS

BACKGROUND

Generally described, companies and organizations operate computer networks that interconnect numerous computing systems to support their operations. The computing systems can be located in a single geographical location (e.g., as part of a local network) or located in multiple distinct geographical locations (e.g., connected via one or more private or public intermediate networks). Data centers may house significant numbers of interconnected computing systems, such as, for example, private data centers operated by a single organization and public data centers operated by third parties to provide computing resources to customers. Public and private data centers may provide network access, power, hardware resources (e.g., computing and storage), and secure installation facilities for hardware owned by the data center, by an organization, or by other customers.

To facilitate increased use of data center resources, virtualization technologies may allow a single, physical computing machine to host one or more instances of virtual machines that appear and operate as independent computer machines to a connected computer user. With virtualization, the single physical computing device can create, maintain, or delete virtual machines in a dynamic manner. In turn, users can request computer resources from a data center and be provided with varying numbers of virtual machine resources on an "as needed" basis, or at least on an "as requested" basis.

In some circumstances, customers may also have production infrastructure that implement various workflows or other processes. The production infrastructure can include physical computing resources, such as central processing units (CPUs), storage media, memories, network interfaces, etc. that are maintained by the customer or on behalf of a customer. Additionally, such computing resources may include unique or uncommon resources, or resource configurations, or otherwise be associated with computing resources that are not easily replicated in a network-based environment. For example, production computing resources may include an operating system or an operating system version that is no longer available/supported or otherwise may not be capable of being implemented in a hosted network environment. In another example, production computing resources can also include custom components, e.g., hardware memory resources that would be more difficult to replicate exactly in a hosted network environment.

BRIEF DESCRIPTION OF THE DRAWINGS

The foregoing aspects and many of the attendant advantages will become more readily appreciated and understood by reference to the following detailed description, when taken in conjunction with the accompanying drawings, wherein.

DETAILED DESCRIPTION

Figure 1:
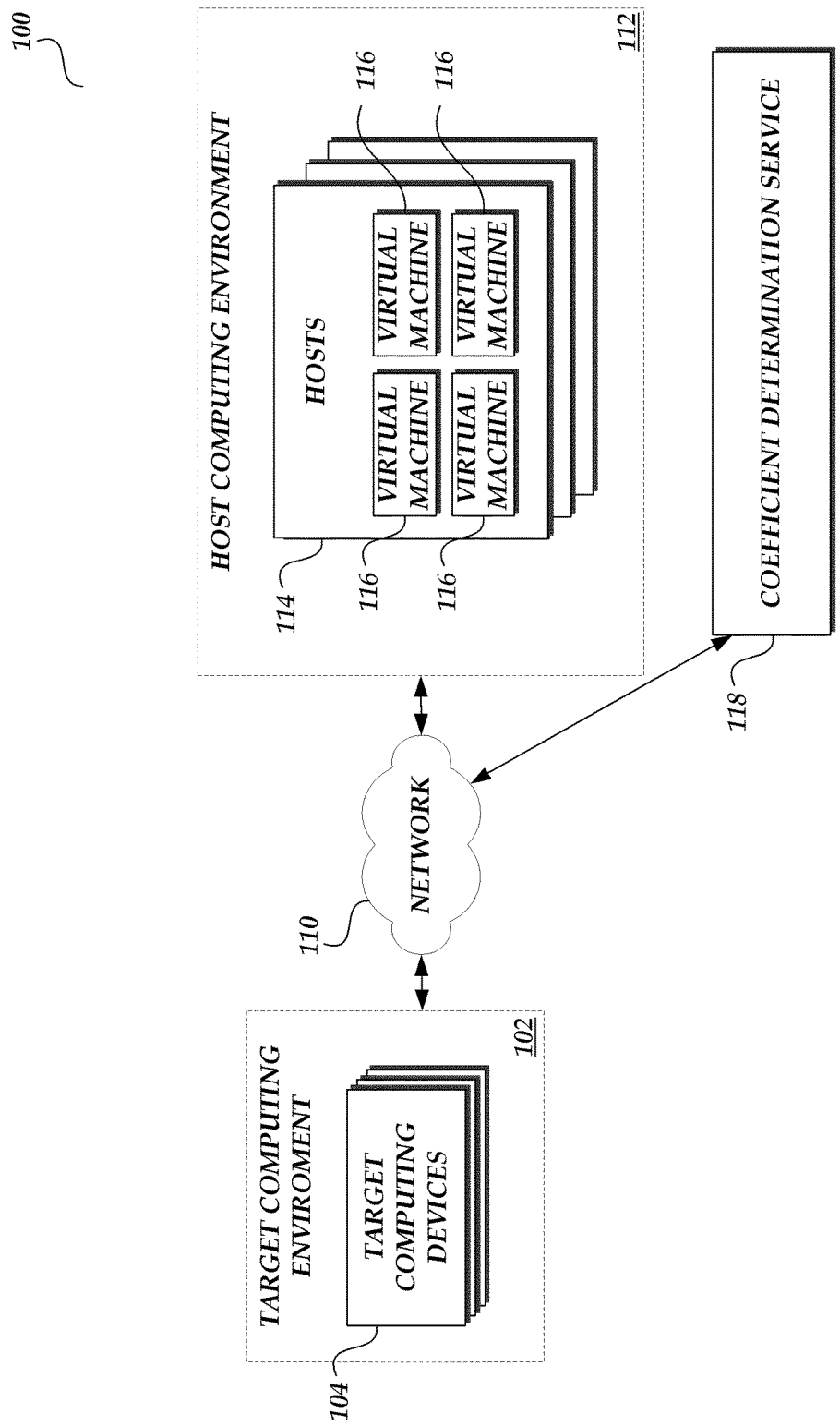
FIG. 1 is a schematic block diagram of an illustrative network topology including a target computing environment, a networked computing environment, and a coefficient determination service interconnected via a network.

Generally described, aspects of the present disclosure are directed to simulating the performance of production hardware and software in a hosted network environment. More specifically, aspects of the present disclosure correspond to systems, methods, and computer-readable media related to determining a coefficient of equivalency between two computing environments. Illustratively, resource metrics for a target computing environment are transmitted to a coefficient determination service. The resource metrics may correspond to one or more computing resources of the target computing environment. The resource metrics may indicate, for example, the maximum capability or capacity of the target computing environment with regard to an indicated resource. Alternatively, in some embodiments, a resource metric may indicate the available capacity or capability.

The coefficient determination service may further receive a definition of a workload. The workload may be defined by a set of computer-readable instructions, and executing these instructions in the target environment may cause utilization of the target environment's computing resources. In some embodiments, the workload may be defined in terms of resource utilization. In further embodiments, the workload may be executed in the target computing environment, and the resource metrics for the target computing environment may be collected during the execution of the workload. Illustratively, the workload may be specific to the target computing environment, or may be a reference workload that is based on a generic service or application.

With continued reference to the illustrative example, the coefficient determination service may then cause execution of the workload in a networked computing environment. Illustratively, the coefficient determination service may cause execution of the workload by causing instantiation of a virtual machine instance, and then loading and causing execution of the workload on the instantiated virtual machine. The coefficient determination service may further generate or obtain resource metrics for each networked computing environment. A networked computing environment may, for example, have predetermined resource metrics based on provisioning specifications, established performance characteristics, or other data. Illustratively, resource metrics for a networked computing environment may be generated by causing execution of the reference workload in the networked computing environment, monitoring the execution of the workload, and collecting the resource metrics.

In another aspect of the present disclosure, the coefficient determination service may model execution of the workload in a plurality of networked computing environments. The coefficient determination service may model execution of the workload in networked computing environments based on execution of the workload in the target computing environment and resource metrics obtained for the respective computing environments.

The coefficient determination service may further calculate utilization metrics for the resources of the networked computing environment. Illustratively, the coefficient determination service may calculate utilization metrics for individual resources as they are utilized during execution of the workload in the networked computing environment. For example, the service may calculate a total duration of utilization for each of the networked computing resources. One skilled in the art will appreciate that the service may consider different aspects of a resource, such as reading and writing to a storage medium or the bandwidth and latency of a network, as distinct networked computing resources, and may calculate separate utilization metrics for each. Illustratively, the computing resources monitored by the coefficient determination service may include, as non-limiting examples, central processing units (CPUs), memories, network interfaces, computer-readable storage media, graphics processing units (GPUs), operating systems, and the like. As further non-limiting examples, utilization metrics may be specified in terms of time, throughput, cost, operations per second, reads, writes, processing cycles, or other similar criteria.

Further, the coefficient determination service may illustratively determine a resource coefficient for each of the monitored resources. The resource coefficient may be based on the monitored performance of the resource in the networked environment and the resource metrics of the target environment. For example, the coefficient determination service may compare a resource metric indicating a 48 MB/s write speed for storage media in the networked computing environment to a resource metric indicating a 200 MB/s write speed for storage media in the production environment, and determine a resource coefficient of 0.24. Although described herein with regard to write speeds and throughput, resource coefficients may be determined based on any resource metric.

The coefficient determination service may, in one aspect, model execution of the workload in the target computing environment. Illustratively, the service may model execution of the workload by predicting, for each of the resources in the target computing environment, a utilization metric for the resource, based on the resource coefficient and the utilization metric for the corresponding networked computing resource. In another aspect, as discussed above, the coefficient determination service may model execution of the workload in a plurality of networked computing environments. The coefficient determination service may then calculate an aggregate duration for the one or more networked computing environments and an aggregate duration for the target computing environment, based on the utilization metrics for each computing resource in each networked computing environment and the utilization metrics for each computing resource in the target computing environment.

The service may then determine a coefficient of equivalency for each networked computing environment based on at least the workload, the aggregate duration for the networked computing environment, and the aggregate duration for the target computing environment. Once calculated, the coefficient of equivalency may be used to predict, for example, the performance of the target computing environment as the specified workload is executed. The coefficient of equivalency may further be used, illustratively, to determine which of a set of networked computing environments provides performance most similar to the target computing environment, or performance most similar to a specified performance target.

Illustratively, the coefficient of equivalency generally relates to an expression correlating performance of aspects of one computing environment to another computing environment. A coefficient of equivalency may be calculated with regard to the execution of a specified or defined workload. In some embodiments, the coefficient of equivalency may be expressed as an unbound ratio or quotient comparing time of execution experienced or measured by a networked computing environment and the target computing environment. For example, a coefficient of equivalency of 1:2 or 0.50 may represent a determination that a networked computing environment executes a workload in half the time projected for a target computing environment. As a further example, a coefficient of equivalency of 4:3 or 1.33 may represent a determination that a networked computing environment requires, e.g., 80 seconds to execute a workload that takes 60 seconds in the target computing environment.

In other embodiments, a coefficient of equivalency may be expressed according to a range of possible values that can be attributed to a measured time associated with networked computing environment and the target computing environment. For example, a coefficient of equivalency may be selected from one of four possible values (e.g., 0.25, 0.50. 75 or 1) based on a comparison of the likely similarity of the execution of a target workload. In still other embodiments, a coefficient of equivalency may be expressed in non-numerical form based on a comparison of the likely similarity of the execution of a target workload (e.g., dissimilar, similar, very similar).

In still further embodiments, the coefficient of equivalency may also be expressed in terms of a measured cost associated with the execution of a target workload. For example, a coefficient of equivalency may be determined based on a power consumed during the execution, staffing attributed to causing the execution of the workload, hardware or facilities costs, and the like. One skilled in the art will appreciate that a coefficient of equivalency may be expressed as a combination of a ratio, fraction, numeric value, category ("higher performance," "equivalent performance," etc.), or in any other terms that relate performance or communicate a determined performance.

Though described herein with respect to networked computing environments, embodiments of the present disclosure may be applied to the use of any computing environments for any purpose. For example, aspects of the present disclosure may be used to assess networked computing environments that differ solely in terms of one or more computing resources, e.g., to assess the execution of a particular workload in otherwise-identical computing environments where one of the environments has applied a memory upgrade and an operating system patch. As a further example, aspects of the present disclosure may be used to assess whether a proposed physical computing environment performs adequately relative to a current physical computing environment. Accordingly, the examples provided in the present disclosure are not intended to be limiting and do not preclude broader applications.

The foregoing aspects and many of the attendant advantages will become more readily appreciated as the same become better understood by reference to the following description of illustrative embodiments, when taken in conjunction with the accompanying drawings depicting the illustrative embodiments.

FIG. 1 is a block diagram depicting an illustrative network topology 100 including a target computing environment 102 with multiple target computing devices 104, a host computing environment 112 containing multiple virtual machines 116 executing on multiple hosts 114, and a coefficient determination service 118, which communicate with each other via a network 110. For purposes of the present application, the target computing environment 102 can be referred to as a customer computing environment that will be used as the basis for comparison when calculating coefficients of equivalency.

Target computing devices 104 may generally include any physical or virtual computing device communicating with the host computing environment 112 or the coefficient determination service 118. The target computing devices 104 may have one or more physical or virtual processors, input/output devices, network interfaces, memories, storage devices, or communication buses (not depicted in FIG. 1), and may provide connectivity to and from one or more networks, including network 110. The target computing devices 104 may store and implement computer executable instructions defining a workload, as discussed in more detail below. Collectively, the target computing devices 104 define a target computing environment 102 having performance metrics that may be measured and profiled.

The network topology 100 further includes a network 110 operable to enable communication between the target computing devices 102, the networked computing environment 112, and the coefficient determination service 118. The network 110 may be any wired network, wireless network, or combination thereof. In addition, the network 110 may be a personal area network, local area network (LAN), wide area network (WAN), cable network, satellite network, cellular telephone network, over-the-air broadcast network (e.g., for radio or television), or a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. Protocols and components for communicating via the Internet or any of the other aforementioned types of communication networks are well known to those skilled in the art of computer communications and thus need not be described in more detail herein.

The illustrated network topology 100 further includes a number of virtual machines 116 executing on hosts 114 in a host computing environment 112. As illustrated in FIG. 1, the host computing environment 112 may provide multiple virtual machines 116, each of which may represent a distinct networked computing environment with its own resource profile. For example, the host computing environment 116 may provision each virtual machine 116 with a defined set of computing resources (not depicted in FIG. 1) that are made available to the virtual machine 116 as required. The defined set of computing resources for one virtual machine 116 may differ from another. Illustratively, a virtual machine 116 may be provisioned for a workload having high memory usage, such as a database application, or for a workload having high CPU usage, such as a scientific application. Alternatively, in some embodiments, the host computing environment 112 may not place a particular limit on the resources available to a virtual machine 116 beyond the availability of the hosts 114. In some embodiments, the coefficient determination service 118 may cause instantiation of one or more virtual machines 116 to implement aspects of the present disclosure. In other embodiments, the coefficient determination service 118 may interact with previously instantiated virtual machines 116.

The network topology may further include a coefficient determination service 118, which determines a coefficient of equivalency for a particular workload, target computing environment 102 and networked computing environment corresponding to a virtual machine 116. In some embodiments, the coefficient determination service 118 further identifies a particular networked computing environment based on the determined coefficients of equivalency and a performance target. Generally, the coefficient determination service 118 can correspond to a hard disk drive, network accessible storage, or any other type of perpetual or substantially perpetual storage containing computer program instructions and other information for implementing aspects of the present disclosure. As illustrated in FIG. 1, the coefficient determination service 118 can be configured to operate separately from the host computing environment 112 and may communicate with the host computing environment 112 and the target computing environment 102 via the network 110. In other embodiments that are not illustratively depicted, the coefficient determination service 118 can be configured to operate on the hosts 114 or the virtual machines 116 of the host computing environment 112. For example, the coefficient determination service can be configured to operate on a physical computing device (e.g., a host 114), a virtual computing device (e.g., a virtual machine 116), or multiple computing devices in communication with one another.

In various embodiments, the coefficient determination service 118 obtains from the target computing environment 102 a resource profile via network 110. The resource profile may contain resource metrics for one or more of the target computing devices 102. The coefficient determination service 118 further obtains from the target computing environment 102, via network 110, a definition of a workload. The definition of the workload may include computer-readable instructions that, when executed in the target computing environment 112, cause utilization of one or more resources associated with the target computing environment 112, such as the resources of the target computing devices 104. As will be described in more detail below, the coefficient determination service 118 may then cause execution of the workload in a networked computing environment within the host computing environment 112 (e.g., on one or more of the virtual machines 116) and calculate a coefficient of equivalence between environments for the workload.

Figure 2:
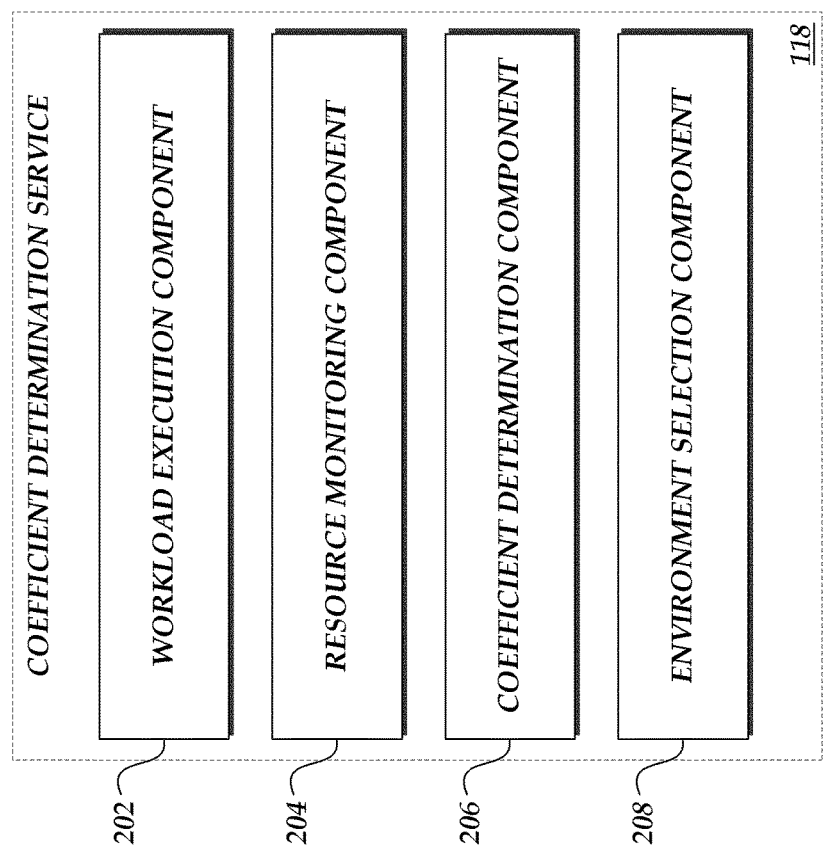
FIG. 2 is an illustrative block diagram depicting components of a coefficient determination service included within the network topology of FIG. 1.

FIG. 2 is a block diagram depicting illustrative components of the coefficient determination service 118 (FIG. 1). Illustratively, the function of the coefficient determination service can be associated with various components. More specifically, the coefficient determination service 118 includes a workload execution component 202 for causing or modeling execution of the workload in a computing environment. The coefficient determination service 118 further includes a resource monitoring component 204, which may monitor execution of the workload in a computing environment, and which collects metrics, durations, and other data relating to the execution of the workload in the computing environment. The coefficient determination service 118 also includes a coefficient determination component 206, which processes the data collected by the resource monitoring component 204 to determine a coefficient of equivalency for the workload and the computing environments. In addition, in some embodiments, the coefficient determination service 118 includes an environment selection component 208, which may identify one or more networked computing environments based on the coefficients of equivalency for the respective networked computing environments and a performance target. As one skilled in the art will appreciate, the components of FIG. 2 are illustrative and the functions of the coefficient determination service 118 may be implemented as different components or in other combinations.

Illustratively, the workload execution component 202, the resource monitoring component 204, the coefficient determination component 206, and the environment selection component 208 may include a number of hardware and software components. More specifically, the workload execution component 202, the resource monitoring component 204, the coefficient determination component 206, and the environment selection component 208 may include hardware, software, configuration data, data structures, computer-readable code, or any type of information that can be loaded into memory and processed by these components of the coefficient determination service 118. Aspects of the workload execution component 202, the resource monitoring component 204, the coefficient determination component 206, and the environment selection component 208 will be described in further detail below with respect to FIG. 3. In various embodiments, reference to the coefficient determination service 118 within the present disclosure may include multiple computing devices working in conjunction to facilitate the calculation of coefficients of equivalency. For example, in various embodiments, the coefficient determination service 118 may be distributed through a network or implemented by one or more virtual machine instances.

Figure 3:
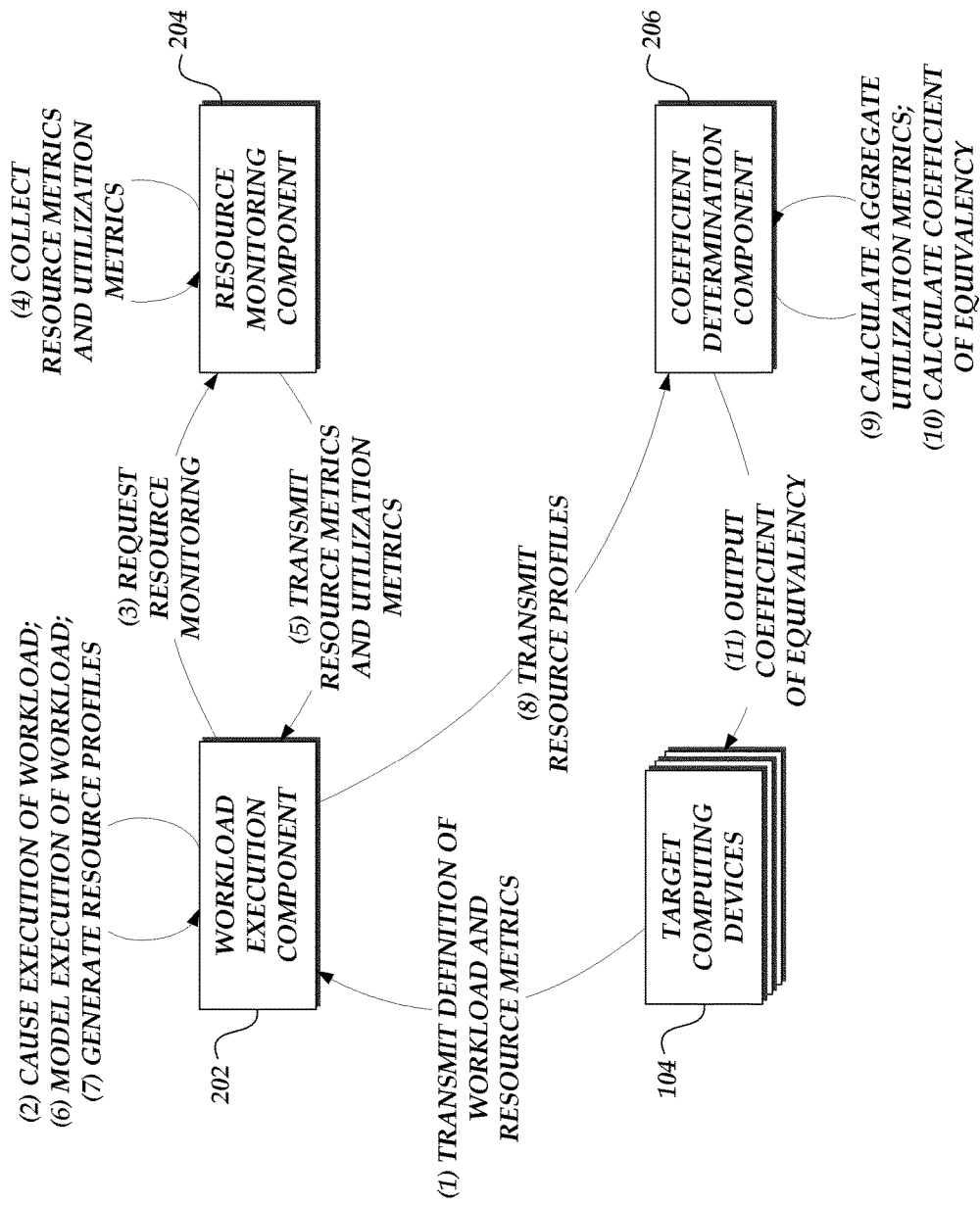
FIG. 3 is an illustrative block diagram depicting determination of a coefficient of equivalency, as performed by the coefficient determination service of FIG. 2.

With reference now to FIG. 3, a block diagram illustrating determination of a coefficient of equivalency for a workload and a pair of computing environments will be described. At (1), the workload execution component 202 receives from target computing devices 104 a definition of a workload and resource metrics for the target computing environment 102. Illustratively, the resource metrics may include metrics such as capacity and throughput (e.g., read/write speed) of, for example, a memory or a storage medium. As a further example, the resource metrics may include a manufacturer's specifications or benchmark performance results for, e.g., a CPU or a GPU. In some embodiments, metrics for the target computing environment 102 may be obtained by monitoring the results of executing a reference workload in the target computing environment 102. One skilled in the art will understand that the target computing devices 104 may themselves be resources of the target computing environment 102, and as such that the resource metrics for the target computing environment 102 may include metrics for the target computing devices 104. As non-limiting examples, the resources of the target computing environment 102 for which metrics may be provided include CPUs, GPUs, memories, network interfaces, computer-readable and computer-writable storage media, operating systems, and the like. The performance metrics may further be specified in terms of actual capacity or available capacity, specifying for example only the capacity that the target computing environment 102 makes available for execution of the workload.

The definition of a workload may illustratively comprise a set of computer-readable instructions that, if executed in the target computing environment 102, would cause utilization of one or more resources of the target computing devices 104. Alternatively, in certain embodiments, the definition of a workload may comprise quantities, durations, or percentages of utilization of one or more resources of the target computing environment 102. For example, a definition of a workload may include instructions to read 10 gigabytes (GB) of data from a storage medium and to write 2 GB of data to a memory. One skilled in the art will appreciate that the workload may be defined primarily in terms of resource utilization, and as such the definition may include or exclude any results or outputs caused by executing the workload.

At (2), the workload execution component 202 causes execution of the workload in a networked computing environment, such as the environment provided by a virtual machine 116 instance. Although not illustrated in FIG. 3, in some embodiments the workload execution component 202 may cause execution of part or all of the workload in a physical computing environment. At (3), the workload execution component 202 requests that the resource monitoring component 204 monitor the execution of the workload. One skilled in the art will appreciate that monitoring the execution of the workload occurs during the workload execution, and thus that the request to monitor execution of the workload may be issued when or even before the workload execution component 202 causes execution of the workload.

During the execution of the workload, at (4), the resource monitoring component 204 illustratively collects metrics regarding the resources and the utilization of resources in the networked computing environment. The collected metrics may correspond to resource metrics identified for the customer computing environment 102. For example, the resource monitoring component 204 may collect a metric indicating an average write speed of 48 MB/s for storage media in the networked computing environment, which may correspond to a metric indicating an average write speed of 220 MB/s for storage media in the customer computing environment 102. In some embodiments, the resource monitoring component 204 may determine metrics to collect based on the resource metrics provided for the target computing environment 102. For example, if the resource metrics for the target computing environment 102 include a stored media write speed, a network latency, and a memory capacity, then the resource monitoring component 204 may monitor and collect metrics for the stored media write speed, network latency, and memory capacity of the networked computing environment.

The resource monitoring component 204 may further collect metrics relating to the utilization of each monitored resource. Illustratively, the resource monitoring component 204 may determine that, over the course of its execution, the workload caused memory reads for a total of nine seconds, writing to storage media for a total of 28 seconds, receiving data via a network for 19 seconds, and utilized the CPU for seven seconds. In some embodiments, the resource monitoring component 204 may treat different operations involving the same virtual resource, such as reading from storage media and writing to storage media, as separately monitored resources. Further, although described herein in terms of duration, in some embodiments utilization metrics may be collected for other dimensions of utilization of the network resources, such as cost or percentage of capacity.

In some embodiments, the resource monitoring component 204 may detect and collect utilization metrics for time periods during which execution of the workload in the networked computing environment was delayed by unavailability of a networked computing resource. For example, a storage medium may be unavailable for a read operation because it is engaged in a write operation that must serially precede the read operation, causing the execution of the workload to be delayed until the storage medium is available for reading. As a further example, the networked computing environment may have been provisioned with quantitative constraints, such as a maximum memory size or a maximum number of CPU cycles, that cause delay in the execution of the workload when the constraint is reached. The resource monitoring component 204 may identify these delays and determine a total duration of unavailability for each of the resources of the networked computing environment.

The resource monitoring component 204 may further determine that one or more resources were substituted for an unavailable resource, and may determine metrics relating to the substitution of resources. For example, the resource monitoring component 204 may determine that a memory capacity limit was reached during execution of the workload in the networked computing environment, and that reaching the capacity limit caused "swapping to disk" and thereby added to the total durations that the workload was reading and writing to storage media. In further aspects, the resource monitoring component 204 may perform this determination and exclude the metrics for substituted resources when it calculates total utilizations.

At (5), the resource monitoring component 204 transmits the collected metrics to the workload execution component 202. Thereafter, at (6), the workload execution component 202 may use the collected metrics to model execution of the workload in the target computing environment 102. Illustratively, the workload execution component 202 may model execution of the workload by determining a resource coefficient for each networked computing resource utilized by the workload, then estimating a utilization of the corresponding resource in the target computing environment 102, based on the resource coefficient and the utilization in the networked computing environment. For example, the workload execution component 202 may determine that a resource, such as a storage medium, has a resource coefficient of 0.24, and that it was utilized for 187 seconds during execution of the workload in the networked computing environment. The workload execution component 202 may thus model that executing the workload in the target computing environment 102 would cause utilization of a corresponding storage medium resource for 45 seconds. The workload execution component 202 may thus estimate utilization metrics for the target computing environment 102 that correspond to the utilization metrics for the networked computing environment.

At (7), the workload execution component 202 may process the collected metrics and the modeled workload to generate resource profiles for the networked computing environment and the target computing environment 102. The resource profile for the networked computing environment may contain metrics that correspond to the metrics in the resource profile for the target computing environment 102, and vice versa. The resource profiles may further contain metrics regarding the utilization, unavailability, and substitution of the respective computing resources, as collected by the resource monitoring component 204 or modeled by the workload execution component 202.

In one aspect, the workload execution component 202 may determine which of the delays caused by unavailability of resources in the networked computing environment may be relevant to the execution of the workload in the target computing environment 102. For example, the workload execution component 202 may determine that a memory constraint reached in the networked computing environment would not be reached in the target computing environment 102, and thus that the total duration of unavailability attributable to reaching the memory constraint need not be considered when calculating total duration of utilization.

At (8), the workload execution component 202 may transmit the generated resource profiles for the target computing environment 102 and the networked computing environment to the coefficient determination component 206. Thereafter, at (9), the coefficient determination component 206 may calculate an aggregate utilization metric for each computing environment. Illustratively, the coefficient determination component 206 may calculate an aggregate utilization metric by summing the utilization metrics for each resource of the computing environment. In some embodiments, the coefficient determination component 206 may calculate aggregate utilizations based in part on unavailability metrics or substitution metrics.

As an example, the coefficient determination component 204 may receive a resource profile for the target computing environment 102 which predicts that execution of the workload will cause the target CPU to be utilized for a total of 8 seconds, reads from the target memory to be utilized for a total of 4 seconds, and writes to the target storage medium to be utilized for a total of 12 seconds. The coefficient determination component 204 may then determine an aggregate utilization for the target computing environment 102 of 8 seconds+4 seconds+12 seconds=24 seconds. The coefficient determination component 206 may further receive a resource profile for the networked computing environment, indicating that execution of the workload caused utilizations of 10 seconds, 16 seconds, and 20 seconds for the corresponding CPU, memory, and storage medium resources in the networked computing environment. The coefficient determination component 206 may therefore determine an aggregate utilization of 46 seconds for the networked computing environment.

At (10), the coefficient determination component 206 may calculate a coefficient of equivalency for the workload, the target computing environment 102, and the networked computing environment, based in part on the aggregate utilization metrics. Illustratively, the coefficient determination component 206 may calculate a coefficient of equivalency of 1.92 for a networked computing environment with measured aggregate utilization of 46 seconds and a target computing environment 102 with predicted aggregate utilization of 24 seconds. As one skilled in the art will appreciate, the calculation of a coefficient of equivalence is specific to the workload and to the environments in which the workload is executed and modeled. Because it is determined for a specific workload, the coefficient of equivalence provides a more accurate prediction of performance than can be obtained merely by comparing the environments to each other.

Figure 4:
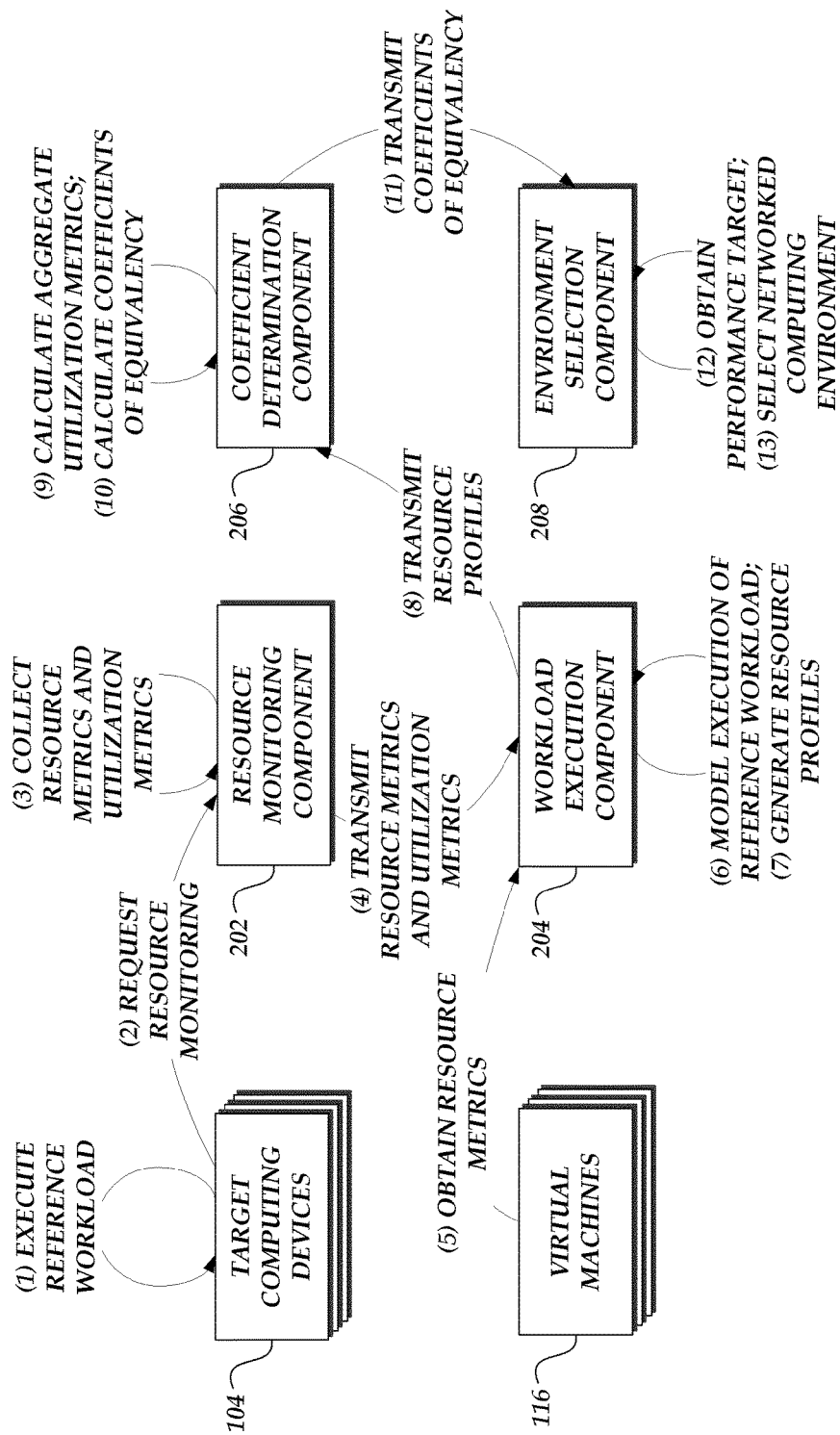
FIG. 4 is an illustrative block diagram depicting selection of a virtual machine based on coefficients of equivalency, as performed by the coefficient determination service of FIG. 2.

With reference now to FIG. 4, a block diagram illustrating selection of a virtual machine based on coefficients of equivalency will be described. At (1), target computing devices 104 execute a reference workload. Illustratively, the reference workload may be based on a workload typically performed by a generic device, such as a database server, web server, application server, media server, file server, or the like. In some embodiments, the reference workload may be specific to the target computing environment. At (2), the target computing devices 104 may request that the resource monitoring component 202 monitor execution of the reference workload for purposes of collecting resource metrics and utilization metrics. Although not illustrated in FIG. 4, in some embodiments monitoring the workload execution and collecting metrics may be performed by the target computing devices 104, and the results transmitted directly from the target computing devices 104 to the workload execution component 202.

At (3), the resource monitoring component 202 may collect resource metrics and utilization metrics for the execution of the reference workload in the target computing environment, as described in detail above. At (4), the resource monitoring component 202 may transmit the collected metrics to the workload execution component 204.

At (5), the workload execution component 204 may obtain resource metrics from a plurality of networked computing environments corresponding to virtual machines 116. As described above, the resource metrics for each networked computing environment may be defined in terms of provisioned capacity, rated performance, collected metrics for similar workloads or similar environments, and the like. In some embodiments, the workload execution component 204 may store resource metrics for specified virtual machines and instantiate virtual machines 116 that correspond to the metrics.

Thereafter, at (6), the workload execution component 204 may model execution of the reference workload in each of the networked computing environments. As described above, the workload execution component 204 may model execution of the reference workload based on the collected metrics for the target computing environment 102 and the networked computing environments, illustratively by calculating a resource coefficient for each resource in the networked computing environment and estimating a total utilization for the resource.

At (7), the workload execution component 204 may process the metrics and the modeled executions to generate a resource profile for each networked computing environment. As described above, the generated resource profiles may contain metrics corresponding to actual or predicted total utilization, unavailability, or substitution for each resource in the networked computing environment for which metrics are obtained. In some embodiments, the workload execution component 204 may maintain a library of resource profiles for various reference workloads and networked computing environments, based illustratively on executing the reference workloads in the networked computing environments, and may utilize existing resource profiles rather than generating them. Further, in some embodiments, the library of resource profiles maintained by the workload execution component 204 may include resource profiles provided by third parties, who may illustratively generate third-party resource profiles by executing reference workloads in third-party environments. At (8), the workload execution component 204 may transmit resource profiles to the coefficient determination component 206.

At (9), the coefficient determination component 206 may calculate aggregate utilization metrics for each of the computing environments. In some embodiments, the coefficient determination component 206 may maintain a library of aggregate utilization metrics for various reference workloads and networked computing environments, and may not rely on the workload execution component 204 transmitting resource profiles for these workloads and environments. As described above, the coefficient determination component 206 may calculate an aggregate utilization metric for a computing environment, for example, by summing individual utilization metrics for the resources of the computing environment.

At (10), the coefficient determination component 206 may process the aggregate utilization metrics to calculate a coefficient of equivalency between the target computing environment 102 and each of the networked computing environments. Illustratively, the coefficient determination component may determine that a set of networked computing environments have coefficients of equivalency of 0.31, 0.78, 0.94, 1.02, and 2.44 with the target computing environment 102, based on the aggregate utilizations calculated for executing the reference workload in each computing environment. At (11), the coefficient determination component 206 may transmit the coefficients of equivalence to the environment selection component 208.

At (12), the environment selection component 208 may obtain a performance target specifying one or more criteria for the computing environment to be selected. In some embodiments, the performance target may be based on the execution of the reference workload. For example, the performance target may specify executing the reference workload 20% faster than the target computing environment. As a further example, the performance target may specify that the performance of the selected computing environment should be as close as possible to the target computing environment 102 without underperforming the target computing environment 102. As a still further example, the performance target specify a target cost in either absolute or relative terms. In some embodiments, the environment selection component 208 may generate a performance target based in part on the execution of the workload in the target computing environment. In other embodiments, the performance target may be obtained from the customer. One skilled in the art will appreciate that the performance target may be obtained at any time prior to the selection of a networked computing environment.

At (13), the environment selection component 208 selects and identifies one or more of the networked computing environments. In some embodiments, the selection of a networked computing environment is based in part on the coefficient of equivalency for each networked computing environment. In additional embodiments, the selection of a networked computing environment is further based in part on the performance target. For example, the virtual machine selection component 206 may select the particular networked computing environment whose coefficient of equivalency with the target computing environment 102 is closest to 1.0, indicating that the performance of the particular networked computing environment most closely approximates the performance of the target computing environment 102—that is, for a set of networked computing environments with calculated coefficients of equivalency of 0.31, 0.78, 0.94, 1.02, and 2.44, the environment selection component 208 may select the environment with a coefficient of 1.02. As a further example, the environment selection component 208 may select the environment with a coefficient of 0.94 if the performance target specifies selecting an environment whose performance is at least as good as the target computing environment 102. Still further, in some embodiments, the environment selection component 208 may determine a target coefficient of equivalency based in part on the performance target.

Figure 5A:
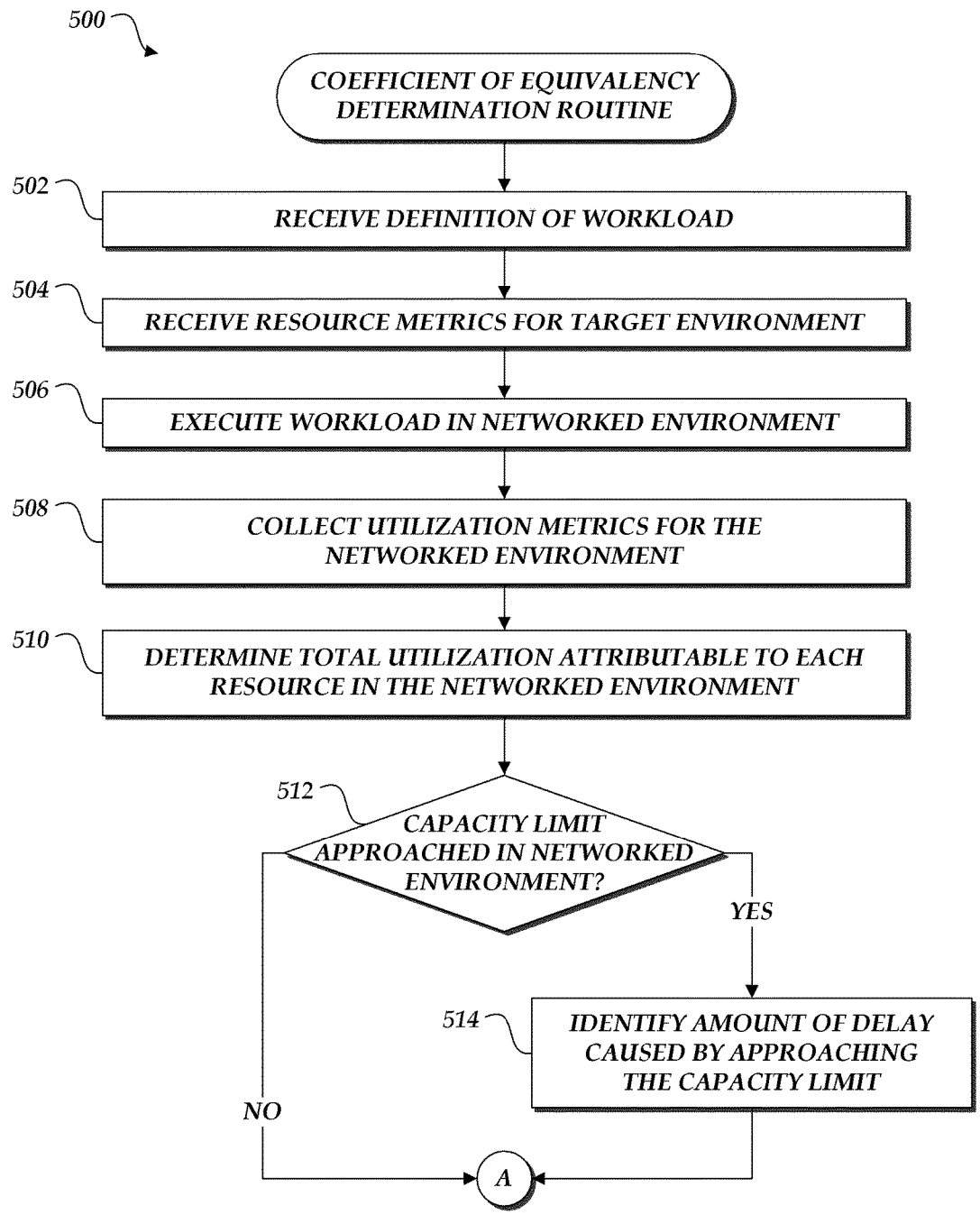
FIGS. 5A and 5B are flow diagrams depicting an illustrative coefficient of equivalency determination routine implemented by a coefficient determination service.
Figure 5B:
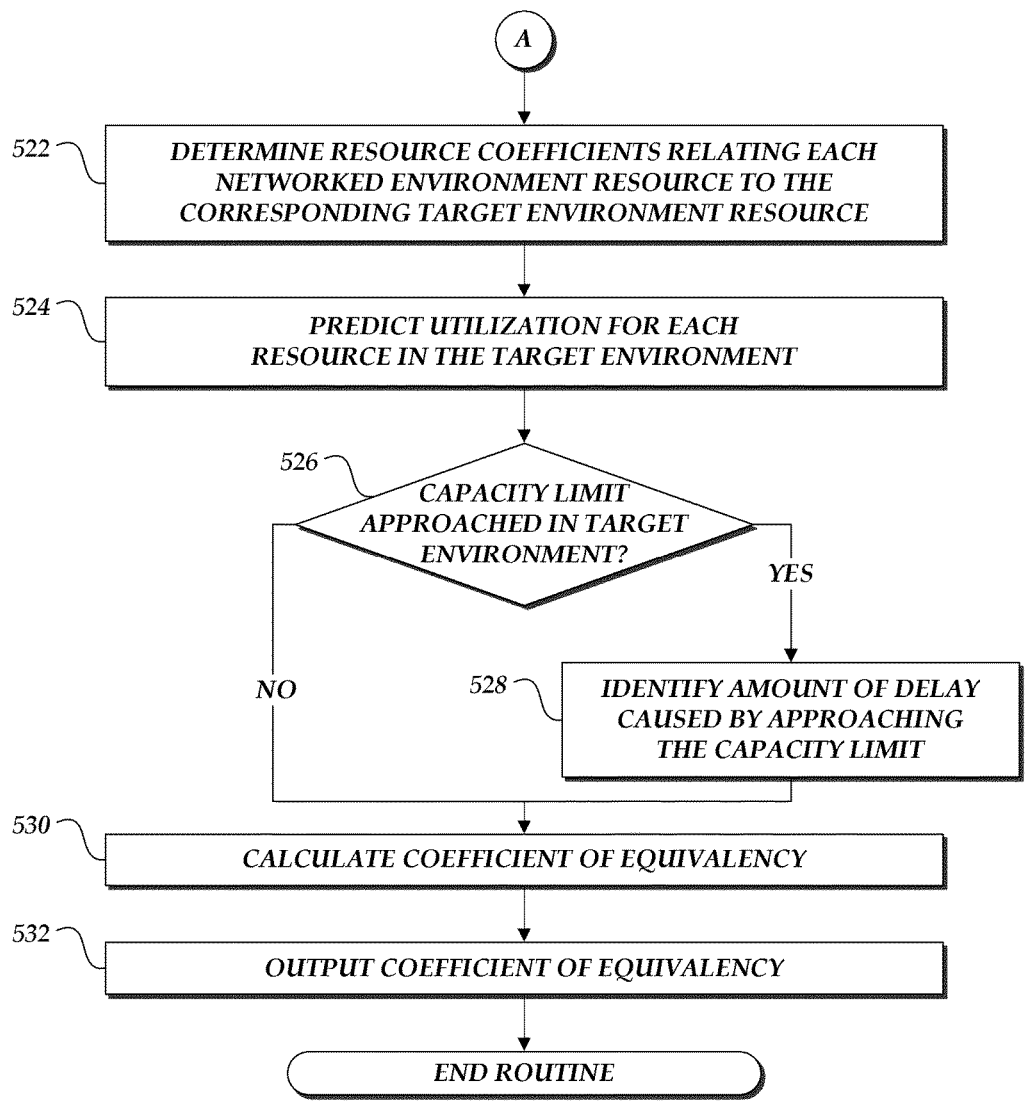

With reference to FIGS. 5A and 5B, one example of a coefficient of equivalency determination routine 500 will be described. The routine 500 may be carried out, for example, by the coefficient determination service 118 of FIG. 2. In some embodiments, blocks of the routine may be carried out by the virtual machine 116 (FIG. 1).

At block 502, resource metrics for the target computing environment 102 may be received. As discussed above, the resource metrics may include information about the capacity of one or more resources in the target computing environment, such as memory sizes, network interface throughputs, storage capacity, and the like. In some embodiments, the resource metrics may indicate maximum capacities of the resources; in other embodiments, the resource metrics may indicate the available capacities. The resource metrics may further relate to the performance of the one or more resources, such as read times, write times, operations per second, latency, and other such measurements. In some embodiments, the resource metrics may be determined based at least in part on execution of a workload in the target computing environment. In further embodiments, resource metrics may be obtained from a library of resource profiles, as described above.

At block 504, a definition of a workload may be received. As described above, the workload may illustratively be defined as a set of computer-executable instructions that, when executed by the target computing environment 102, cause utilization of one or more of the resources for which the resource profile provides information. At block 506 the defined workload may be executed in a networked computing environment, such as the environment associated with a virtual machine 116. In some embodiments, a virtual machine 116 may be instantiated for purposes of executing the workload. The virtual machine 116 may further be instantiated with metrics collection agents for purposes of collecting metrics. In further embodiments, the workload may be executed in a physical computing environment.

At block 508, metrics may be collected regarding the utilization of resources caused by execution of the workload in the networked computing environment. The collected metrics may illustratively include resource metrics that correspond to the resource metrics for the target computing environment. For example, a metric may be collected indicating that writes to storage media in the networked computing environment have a throughput of 45 MB/s, which may correspond to a metric indicating that writes to storage media in the target computing environment 102 have a throughput of 180 MB/s. The metrics may further include capacities, latencies, or any other information corresponding to the resource metrics for the target computing environment 102.

The collected metrics may further include one or more durations for which a networked computing resource was utilized. For example, the metrics may indicate that, during execution in the networked computing environment, the workload read from memory for 28 milliseconds, utilized the CPU for ten milliseconds, read from memory for 18 milliseconds, wrote to storage media for 3.2 seconds, and so forth. One skilled in the art will appreciate that modern computing environments support utilizing resources in parallel, that the durations of utilization for the individual resources may thus not have a linear relationship with the total execution time for the workload, and further that various computing environments may provide varying degrees of support for utilizing resources in parallel. Still further, one skilled in the art will appreciate that execution of the workload may require serial utilization of one or more networked computing resources, and that metrics regarding the dependencies and relationships between the networked computing resources may be collected.

The collected metrics may, in some embodiments, relate to provisioned capacities or other characteristics of one or more resources of the networked computing environment. For example, a particular virtual machine 116 may be provisioned with 2 GB of memory and a network bandwidth of 1 GB/s. These parameters may illustratively be provided to the routine 400 and collected at block 408 as resource metrics for the networked computing environment.

At block 510, a total duration of utilization may be determined for each resource in the networked computing environment. The total duration may be determined, illustratively, by summing the durations for a particular resource that were collected at block 408. In some embodiments blocks 508 and 510 may be combined, and the metrics may be collected by, for example, maintaining a total duration counter for each resource.

At decision block 512, in some embodiments, any capacity limits approached during execution of the workload in the networked computing environment may be identified. A non-limiting example of a capacity limit may be utilization of all available memory in the networked computing environment. Illustratively, a capacity limit may be approached for each of the one or more resources utilized by the workload. If a capacity limit was approached, then at block 514 a total duration of unavailability—that is, a total amount of delay in the execution of the workload—caused by the approach of the capacity limit may be identified. In certain embodiments not illustrated in FIG. 4A, a total duration of substitution for one or more resources may further be identified, such as reads and writes to a memory cache caused by unavailability of a storage medium.

With reference now to FIG. 5B, at block 522—which may be achieved from either block 512 or block 514—a resource coefficient may be determined for each resource in the networked computing environment and its corresponding resource in the target computing environment 102. For example, a resource coefficient of 0.25 may be determined for a networked storage medium with a write speed of 45 MB/s and a corresponding storage medium in the target computing environment with a write speed of 180 MB/s. Resource coefficients may be illustratively based on collected metrics measuring performance of the resource, a rated or specified performance of the resource, predetermined metrics, provisioning parameters, or other such criteria.

At block 524, a duration of utilization for each resource in the target computing environment 102 may be predicted. Illustratively, the duration of utilization for a resource in the target computing environment may be based on a calculated resource coefficient for the resource and the duration of utilization for the corresponding resource in the networked computing environment. For example, a resource metric may indicate that a storage medium in the target computing environment has a write speed of 200 megabytes per second (MB/s), and a corresponding resource metric may indicate that a storage medium in the networked computing environment has a write speed of 48 MB/s. A utilization metric may further indicate that execution of the workload in the networked computing environment caused writes to storage media with a total duration of 208 seconds. Based on these metrics, a resource coefficient of $(48/200)=0.24$ may be calculated. The resource coefficient may then be used to predict a utilization metric for the target computing environment 102, i.e., that executing the workload in the target computing environment 102 would cause writes to storage media with a total duration of $(208 \times 0.24)=49.9$ seconds.

At decision block 526, in some embodiments, a determination may be made for each resource in the target computing environment 102 regarding whether execution of the workload in the target computing environment would approach a capacity limit. Illustratively, the determination may be made based in part on resource metrics for the target computing environment 102. For example, a determination may be made that memory was fully utilized and thus unavailable for a time during execution of the workload in the networked computing environment, and a resource metric for the networked computing environment may indicate that the environment was provisioned with 4 GB of memory. A corresponding resource metric for the target computing environment 102 may indicate that the target computing environment 102 makes 8 GB of memory available to the workload. Based on the resource metrics and the unavailability metric, a determination may be made that a memory capacity limit will not be approached in the target computing environment 102. If a capacity limit may be approached, at block 428, an amount of delay—that is, a duration of unavailability—may be identified for the resource in question. The duration of unavailability may be based on a corresponding duration of unavailability in the networked computing environment. For example, a duration of unavailability of 90 seconds may be identified for a storage medium in the networked computing environment due to serial execution of a write to the storage medium followed by a read from the storage medium. Based on a resource coefficient of 0.25 between the storage media resources, a corresponding duration of unavailability of 15 seconds for the corresponding resource in the target computing environment 102 may be determined.

At block 530, which may be achieved from either block 526 or block 528, a coefficient of equivalency may be calculated. Illustratively, as described above, the coefficient may be calculated by summing the durations of utilization for the networked computing environment, summing the durations of utilization for the target computing environment 102, and determining a ratio. In further embodiments, the coefficient of equivalency may be calculated based on the durations of utilization, the durations of unavailability, and the durations of substitution for each computing environment. At block 532 the coefficient of equivalency may be output to, for example, a customer computing device 104.

Figure 6:
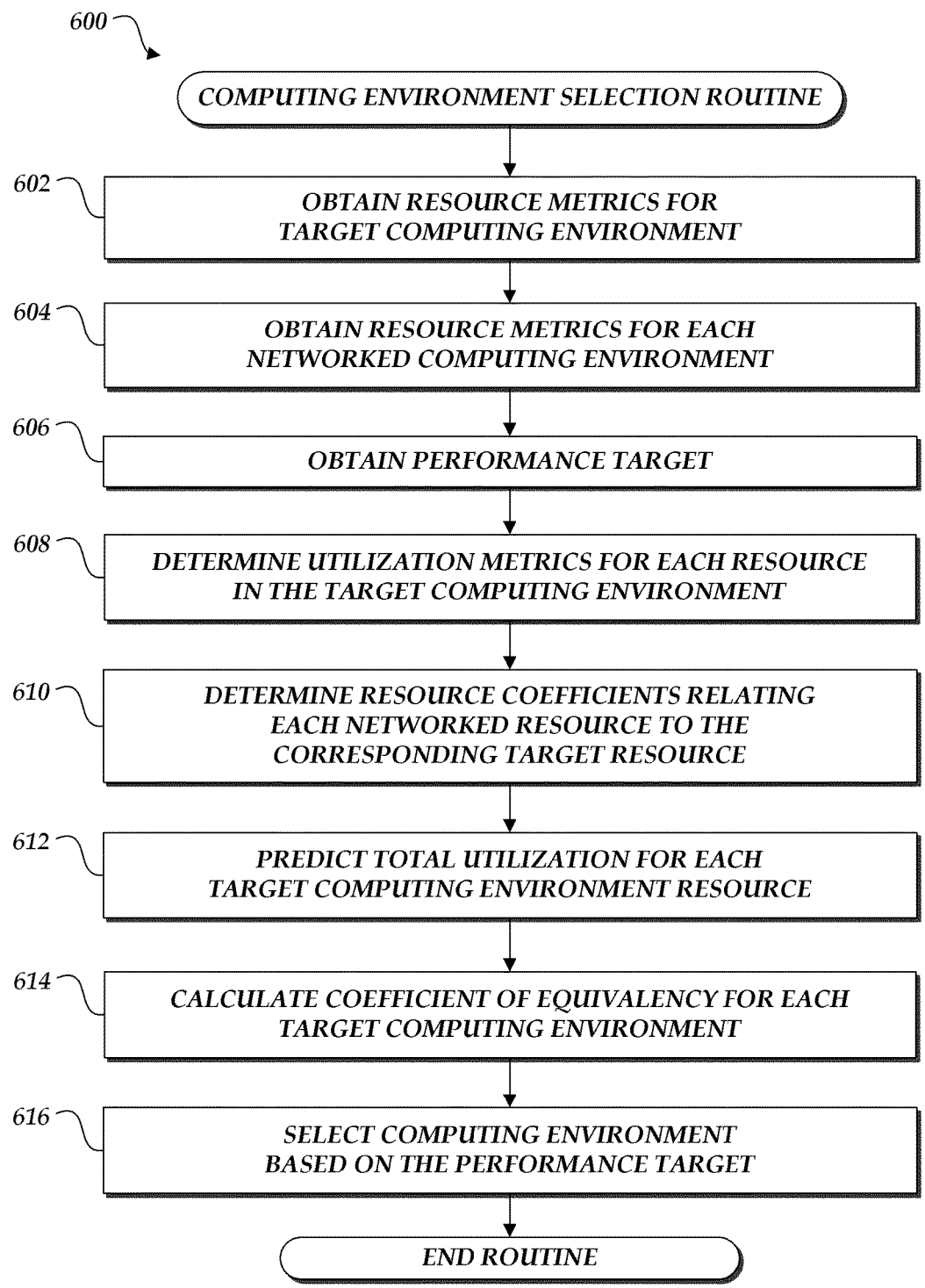
FIG. 6 is a flow diagram depicting an illustrative computing environment selection routine implemented by a coefficient determination service.

With reference to FIG. 6, one example of a computing environment selection routine 600 will be described. The illustrative routine 600 may be carried out, for example, by the virtual machine selection service 118 of FIG. 2. In some embodiments, blocks of the routine may be carried out by the virtual machines 116 (FIG. 1).

At block 602, resource metrics for the target computing environment 102 may be obtained. As discussed above, resource metrics may illustratively include information about the capacity of one or more resources in the target computing environment 102, such as memory sizes, network interface throughputs, storage capacity, and the like. The resource metrics may be determined by causing execution of a reference workload in the legacy computing environment.

At block 604 of the illustrative routine 600, resource metrics may be obtained for each of a plurality of networked computing environments. The resource metrics for a particular networked computing environment may be obtained, for example, by causing execution of a reference workload in the networked computing environment. In certain embodiments, a networked computing environment may furnish preexisting resource metrics. In other embodiments, virtual machines 116 may be instantiated that correspond to resource metrics for networked computing environments.

At block 606, a performance target may be obtained. The performance target may specify a target performance level for a networked computing environment. The performance target may be specified, for example, as a percentage of the utilization of the target computing environment 102. In some embodiments, the performance target may be specified by the customer. In other embodiments, the performance target may be specified as a maximum amount of utilization, such as a fixed cost. In still further embodiments, a performance target may be determined based on the utilization of the target computing environment 102.

At block 608, a total utilization metric for each computing resource in the target computing environment 102 may be determined. As discussed above, the computing resources of the target computing environment 102 may include CPUs, GPUs, memories, network interfaces, computer-readable storage media, operating systems, and the like. At block 610, resource coefficients may be determined relating each networked computing resource to a corresponding target computing resource.

At block 612, a utilization metric may be predicted for each networked computing resource in each of the networked computing environments. Illustratively, the utilization metric may be based in part on the resource coefficient for the networked computing resource, as determined at block 610, and the utilization metric for the corresponding resource in the target computing environment 102, as determined at block 608.

At block 614, a coefficient of equivalency may be calculated for each networked computing environment. The calculation of a coefficient of equivalency for a particular networked computing environment may illustratively be based on determining an aggregate utilization for all resources in the target computing environment, determining an aggregate utilization for all corresponding resources in the networked computing environment, and comparing these values to obtain a ratio. In some embodiments, the coefficient of equivalency may be further based in part on determining totals associated with unavailable resources, totals associated with substitutes for unavailable resources, or other criteria.

Thereafter, at block 616, one or more networked computing environments may be selected from among the plurality of networked computing environments. In some embodiments, as discussed above, the networked computing environment may be selected whose coefficient of equivalency indicates performance approaching parity with the target computing environment 102. In further embodiments, a networked computing environment may be selected whose coefficient of equivalency indicates exceeding the utilization of the target computing environment 102 by the smallest amount. In still further embodiments, a networked computing environment may be selected whose coefficient of equivalency corresponds to a performance target. For example, a performance target may have specified a coefficient of equivalency of 0.8, representing a 20% reduction in utilization. As discussed above, utilization—and therefore the coefficient of equivalency and the performance target—may be based on time, cost, percentage of capacity, other collected metrics, or combinations thereof.

In some embodiments, multiple coefficients of equivalency may be calculated that each relate to a different aspect of the computing environments. Illustratively, a time-based coefficient of equivalency and a cost-based coefficient of equivalency may be calculated. As a further example, coefficients of equivalency may be calculated for each of a set of reference workloads. The coefficients of equivalency may further be aggregated or combined to enable comparisons and selections based on more than one coefficient. For example, a target computing environment may perform as a database server during business hours and a backup file server in the evenings. Coefficients of equivalency may thus be calculated based on reference workloads for a database server and for a file server, and may be combined according to, e.g., a number of hours per day that the target computing environment performs as each, weighting factors reflecting business priorities, or other criteria. The combined coefficient of equivalency may then be used to select one or more networked computing environments as described above.

Figure 7:
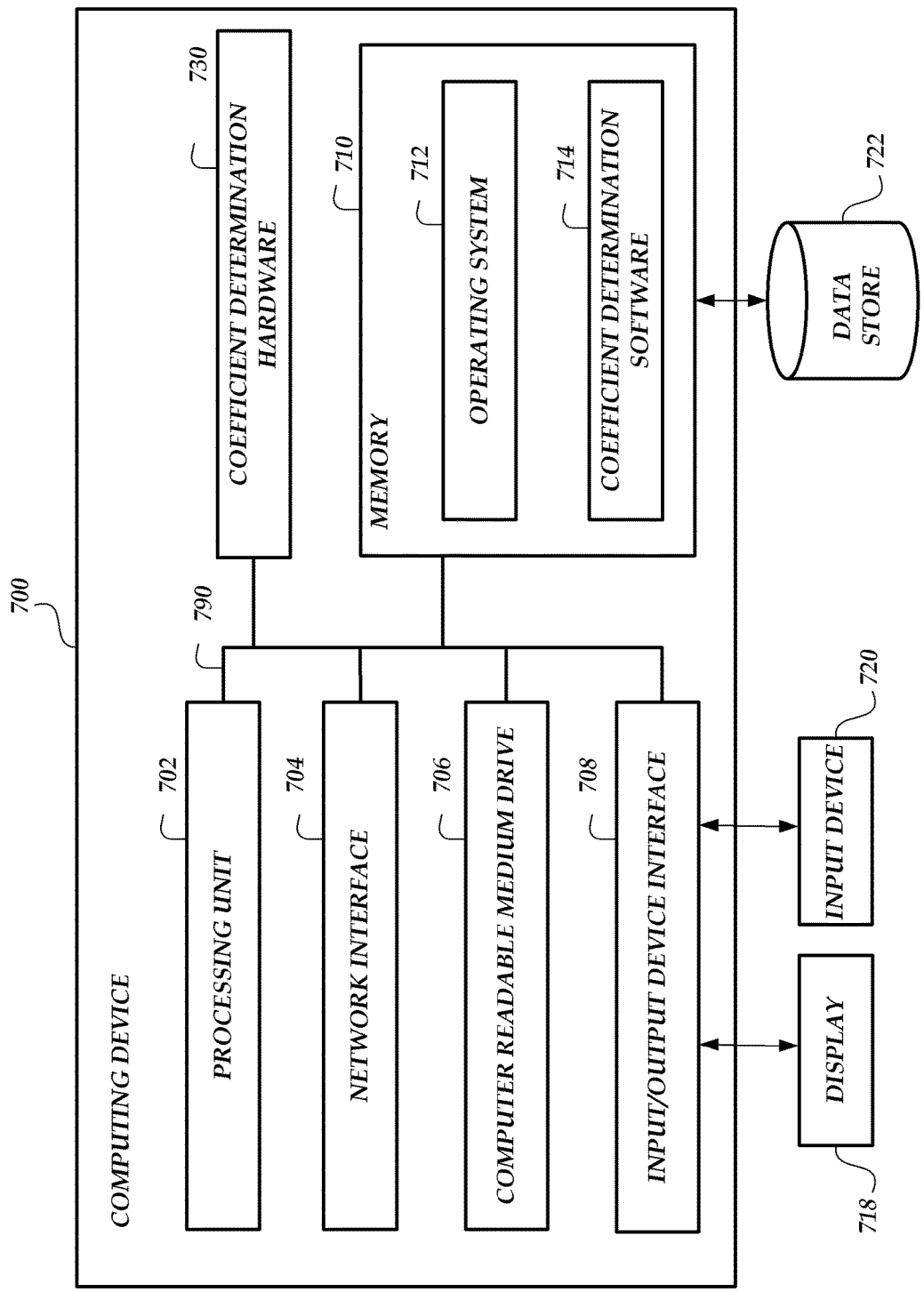
FIG. 7 is an illustrative block diagram of a computing device used to implement a coefficient determination service.

FIG. 7 is an illustrative functional block diagram of a computing device for determining coefficients of equivalency. The computing device 700 can be a server or other computing device, and can comprise a processing unit 702, a network interface 704, a computer readable medium drive 706, an input/output device interface 708, and a memory 710. The network interface 704 can provide connectivity to one or more networks or computing systems. The processing unit 704 can receive information and instructions from other computing systems or services via the network interface 704. The network interface 704 can also store data directly to memory 710. The processing unit 702 can communicate to and from memory 710 and output information to an optional display 718 via the input/output device interface 708. The input/output device interface 708 can also accept input from the optional input device 720, such as a keyboard, mouse, digital pen, microphone, mass storage device, etc.

The memory 710 contains computer program instructions that the processing unit 702 executes in order to implement one or more embodiments. The memory 710 generally includes RAM, ROM, and/or other persistent, non-transitory computer readable media. The memory 710 can store an operating system 712 that provides computer program instructions for use by the processing unit 702 or other elements included in the computing device in the general administration and operation of the computing device 700. The memory 710 can further include computer program instructions and other information for implementing aspects of the present disclosure. For example, in one embodiment, the memory 710 includes coefficient determination software 714 that implements aspects of the present disclosure. The coefficient determination software 714 may illustratively correspond to all or some of the components depicted in FIG. 2, the coefficient of equivalency determination routine 500, or the computing environment selection routine 600.

The computing device 700 may further comprise coefficient determination hardware 730. The coefficient hardware 730 may illustratively implement aspects of the present disclosure, such as the components depicted in FIG. 2 or the illustrative routines of FIGS. 5A, 5B, and 6. In some embodiments, the coefficient hardware 730 may be implemented in part with the processing unit 702, the computer readable medium drive 706, or other elements of the computing device 700.

The elements included in the computing device 700 may be coupled by a bus 790. The bus 790 may be a data bus, communication bus, or other bus mechanism to enable the various components of the computing device 700 to exchange information. In some embodiments, the computing device 700 may include additional or fewer components than are shown in FIG. 7. For example, a computing device 700 may include more than one processing unit 702 and computer readable medium drive 706. In another example, the computing device 702 may not be coupled to a display 718 or an input device 720. In some embodiments, two or more computing devices 700 may together form a computer system for executing features of the present disclosure.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
    under control of a computing device configured with specific computer-executable instructions,
        receiving a request to monitor execution of a workload in a virtual computing environment, wherein the workload is associated with a physical computing environment, the physical computing environment comprising one or more physical computing resources that are not part of computing resources utilized by the virtual computing environment, the one or more physical computing resources including at least one of a central processing unit, a memory, a computer-readable storage medium, or a network;
        obtaining resource metrics for the physical computing environment, the resource metrics comprising capacity and throughput measurements for each of the one or more physical computing resources;
        obtaining a definition of the workload, the workload comprising one or more computer-readable instructions that, when executed in the physical computing environment, cause utilization of the one or more physical computing resources;
        causing execution of the workload in the virtual computing environment, the virtual computing environment providing one or more virtual computing resources;
        monitoring utilization of the one or more virtual computing resources, wherein monitoring the utilization for each of the one or more virtual computing resources comprises:
            determining capacity and throughput measurements for the virtual computing resource; and
            calculating a first duration for which the execution of the workload causes utilization of the virtual computing resource;
        calculating an aggregate duration for the virtual computing environment, wherein calculating the aggregate duration for the virtual computing environment comprises summing the first durations;
        modeling execution of the workload in the physical computing environment, wherein modeling the execution comprises estimating, for each of the one or more physical computing resources, a second duration for which the modeled execution of the workload predicts utilization of the physical computing resource, wherein estimating the second duration for each physical computing resource is based at least in part on the first duration for a corresponding virtual computing resource, the capacity and throughput measurements for the corresponding virtual computing resource, and the capacity and throughput measurements for the physical computing resource;
        calculating an aggregate duration for the physical computing environment, wherein calculating the aggregate duration for the physical computing environment comprises summing the second durations; and
        determining a coefficient of equivalency that correlates performance of the virtual computing environment to performance of the physical computing environment based at least in part on the workload, the aggregate duration for the virtual computing environment, and the aggregate duration for the physical computing environment.

2. The computer-implemented method of claim 1, wherein monitoring the utilization of one or more virtual computing resources further comprises calculating, for each of the one or more virtual computing resources, a third duration for which execution of the workload exceeds the capacity of the virtual computing resource, and wherein calculating the aggregate duration for the virtual computing environment further comprises summing the third durations.

3. The computer-implemented method of claim 2, wherein modeling execution of the workload in the physical computing environment further comprises calculating, for each of the one or more physical computing resources, a fourth duration based at least in part on the third duration for a corresponding virtual computing resource, the fourth duration comprising at least one of:
    a duration for which the modeled execution of the workload in the physical computing environment predicts exceeding the capacity of the physical computing resource; or
    a duration for which the modeled execution of the workload in the physical computing environment predicts utilizing the physical computing resource;
    wherein calculating the aggregate duration for the physical computing environment further comprises summing the fourth durations.

4. The computer-implemented method of claim 1 further comprising:
    transmitting the coefficient of equivalency to a customer computing device.

5. The computer-implemented method of claim 1, wherein determining the coefficient of equivalency comprises determining a ratio between the aggregate duration for the virtual computing environment and the aggregate duration for the physical computing environment.

6. A system comprising:
    a non-transitory computer-readable data store configured to store specific computer-executable instructions; and
    a computing device including a processor in communication with the non-transitory computer-readable data store, the processor configured to execute the computer-executable instructions to at least:
        obtain one or more resource metrics for each of one or more target computing resources in a target computing environment;
        obtain a definition of a workload, the workload comprising one or more computer-readable instructions that, when executed in the target computing environment, cause utilization of the one or more target computing resources;
        monitor utilization of one or more virtual computing resources of a virtual computing environment, wherein the virtual computing environment is hosted in a host computing environment, wherein the target computing environment is not part of the host computing environment, and wherein monitoring the utilization comprises collecting a resource metric and calculating a utilization metric for each of the one or more virtual computing resources;

determine an aggregate duration for the virtual computing environment, the aggregate duration for the virtual computing environment based at least in part on the utilization metric for each of the one or more virtual computing resources;

determine an aggregate duration for the target computing environment, the aggregate duration for the target computing environment based at least in part on the utilization metrics for each of the one or more target computing resources; and determine a coefficient of equivalency that correlates performance of the virtual computing environment to the target computing environment based at least in part on the workload, the aggregate duration for the virtual computing environment, and the aggregate duration for the target computing environment.

7. The system of claim 6, the processor further configured to execute the computer-readable instructions to at least:
cause execution of the workload in the virtual computing environment.

8. The system of claim 6, the processor further configured to execute the computer-readable instructions to at least:
model execution of the workload in the target computing environment, wherein modeling the execution of the workload in the target computing environment comprises predicting a duration of utilization for each of the one or more target computing resources, the prediction based at least in part on the resource metric for the target computing resource, the resource metric for a corresponding virtual computing environment resource, and the utilization metric for the corresponding virtual computing environment resource.

9. The system of claim 6, the one or more target computing resources comprising at least one of a central processing unit, a memory, a network interface, a computer-readable storage medium, a graphics processing unit, or an operating system.

10. The system of claim 6, wherein monitoring the utilization of the one or more virtual computing resources further comprises calculating a duration of unavailability for each of the one or more virtual computing resources, and wherein the aggregate duration for the virtual computing environment is further based at least in part on the durations of unavailability for each of the one or more virtual computing resources.

11. The system of claim 10, wherein modeling the execution of the workload in the target computing environment further comprises:
predicting a duration of unavailability for each of the one or more target computing resources, the prediction based at least in part on the performance metric for the target computing resource, the performance metric for the corresponding virtual computing resource, and the duration of unavailability for the corresponding virtual computing resource;
wherein the utilization metric for each of the one or more target computing resources is further based at least in part on the duration of unavailability for the corresponding virtual computing resource, and wherein the aggregate duration for the target computing environment is further based at least in part on the durations of unavailability for each of the one or more target computing resources.

12. The system of claim 6, wherein the performance metric for each of the one or more target computing resources comprises at least one of a capacity, a throughput, a cost, a number of operations per second, a read time, a write time, a response time, or a bandwidth.

13. The system of claim 6, wherein predicting the duration of utilization for each of the one or more target computing resources is based at least in part on:
calculating, for each of the one or more target computing resources, a resource coefficient relating the target computing resource to a corresponding virtual computing resource, the resource coefficient based at least in part on the performance metric for the target computing resource and the performance metric for the corresponding virtual computing resource; and
calculating, for each of the one or more target computing resources, a duration of utilization, the calculation based at least in part on multiplying the resource coefficient for the target computing resource and the utilization metric for the corresponding virtual computing resource.

14. A computer-implemented method comprising:
under control of a computing device configured with specific computer-executable instructions,
causing execution of a workload in a networked computing environment, the networked computing environment providing one or more networked computing resources, the workload comprising one or more computer-readable instructions that, when executed in a target computing environment that is not part of the networked computing environment, cause utilization of one or more target computing resources with specified resource metrics;
monitoring utilization of the one or more networked computing resources, wherein monitoring the utilization for each of the one or more networked computing resources comprises collecting a utilization metric;
determining an aggregate utilization for the networked computing environment;
modeling execution of the workload in the target computing environment;
determining an aggregate utilization for the target computing environment; and
generating a numeric expression that relates the utilization of the one or more networked computing resources by the networked computing environment to the utilization of the one or more target computing resources by the target computing environment, wherein the numeric expression is based at least in part on the workload, the aggregate utilization for the networked computing environment, and the aggregate utilization for the target computing environment.

15. The computer-implemented method of claim 14, wherein monitoring the utilization for each of the one or more networked computing resources further comprises collecting an unavailability metric, and wherein determining an aggregate duration for the networked computing environment is based at least in part on the utilization metric and the unavailability metric.

16. The computer-implemented method of claim 14, wherein modeling execution of the workload in the target computing environment comprises:

calculating a resource coefficient for each of the one or more target computing resources, the resource coefficient based at least in part on the resource metric for the target computing resource and the resource metric for a corresponding networked computing resource;

predicting a utilization metric for each of the one or more target computing resources, the predicted utilization metric for the target computing resource based at least in part on the resource coefficient for the target computing resource and a utilization metric for the corresponding networked computing resource; and predicting an unavailability metric for each of the one or more target computing resources, the predicted unavailability metric for the target computing resource based at least in part on the resource coefficient for the target computing resource and an unavailability metric for the corresponding networked computing resource.

17. The computer-implemented method of claim 16, wherein determining an aggregate utilization for the target computing environment is based at least in part on the predicted utilization metrics for the target computing resources and the predicted unavailability metrics for the target computing resources.

18. The computer-implemented method of claim 14, wherein a resource profile for the target computing environment is obtained by causing execution of a reference workload in the target computing environment.

19. The computer-implemented method of claim 14, wherein the resource metrics for each of the one or more networked computing devices are predetermined.

20. The computer-implemented method of claim 14, wherein the resource metrics for each of the one or more networked computing devices are determined based at least in part on the execution of the workload in the networked computing environment.

21. The computer-implemented method of claim 14, wherein the numeric expression is a ratio.

* * * * *